June 22, 1926.
T. R. EVANS, SR
SPRAYING MACHINE
Filed Sept. 14, 1925
1,589,684
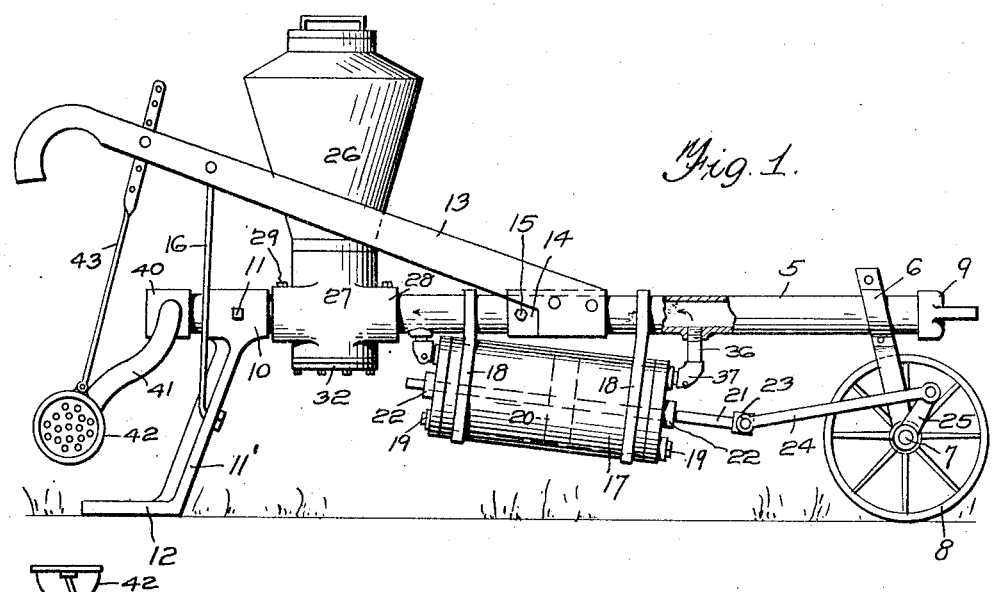
Fig. 1.
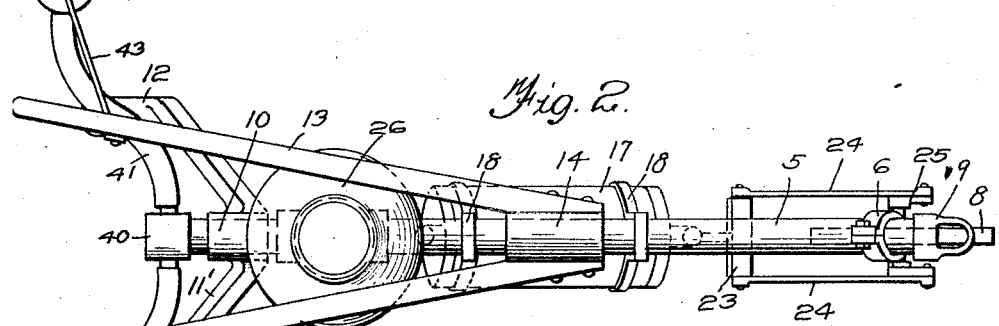
Fig. 2.
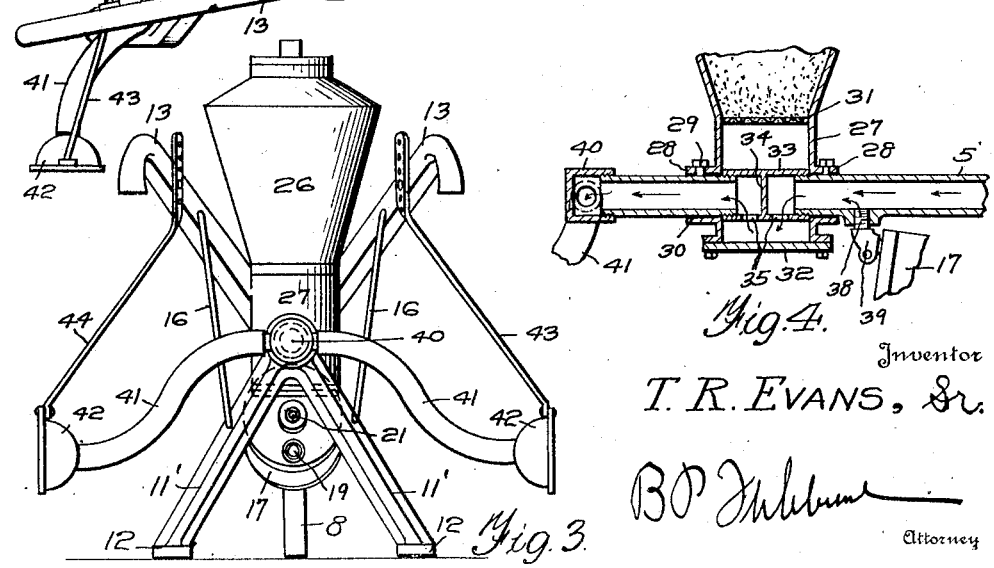
Fig. 3.
Fig. 4.
Inventor
T. R. Evans, Sr.
Attorney Patented June 22, 1926.

1,589,684

UNITED STATES PATENT OFFICE.

THOMAS R. EVANS, SR., OF SUMTER, SOUTH CAROLINA.

SPRAYING MACHINE.

Application filed September 14, 1925. Serial No. 56,218.

My invention relates to a machine for applying an insecticide to plants.

My invention is particularly designed for applying a powdered insecticide to the cotton plant, and is adapted to be driven down the row, and will blow the powdered insecticide upon the plants. The machine is of simple construction, the parts are so arranged that they are balanced and the machine may be drawn by a single draft animal, and manipulated by a single operator.

In the accompanying drawings forming a part of this specification and in which like numerals are employed to designate like parts throughout the same, Figure 1 is a side elevation of a machine embodying my invention, Figure 2 is a plan view of the same, Figure 3 is an end elevation, and, Figure 4 is a detailed section through the bottom of the hopper and associated elements.

In the drawings, wherein for the purpose of illustration is shown a preferred embodiment of my invention, the numeral 5 designates a longitudinal preferably tubular beam, which is preferably generally horizontally arranged and having depending standards 6, disposed upon the opposite sides thereof, near its forward end, and rigidly clamped or otherwise suitably secured thereto. At their lower ends, these standards are equipped with bearings, for receiving a rotatable transverse shaft or axle 7, having a traction wheel 8, rigidly mounted thereon. At its forward end, the beam is provided with a clevis 9, which may be threaded upon the same, and to which the draft animal may be attached by the usual means.

Near its rear end, the beam 5 is provided with a sleeve 10, rigidly clamped thereon by means of a bolt 11 or the like, and this sleeve carries depending downwardly diverging legs 11', disposed upon opposite sides of the beam, and preferably carrying slide shoes 12. Handles 13 are provided which are rigidly attached to a sleeve 14, in turn clamped to the tubular beam 5 by means of the bolt 15 or the like. These handles diverge rearwardly and are preferably connected with the legs 11 by braces 16.

The numeral 17 designates a pump cylinder preferably disposed beneath the tubular beam 5, with its longitudinal axis in alinement with the longitudinal axis of the beam 5, so that it is balanced. This cylinder is rigidly held upon the beam 5 by straps 18, attached thereto, and to the beam. The cylinder 17 is preferably inclined, and has its longitudinal axis in alinement with the axis of the shaft 7. The cylinder 17 is provided at its ends with inwardly opening check valves 19, and a plunger 20 is mounted to reciprocate within this cylinder and is rigidly mounted upon a plunger rod 21, slidable within stuffing boxes 22.

At its forward end, the plunger rod 21 is rigidly attached to a cross head 23, projecting for equal distances upon the opposite sides of the same, and this cross head has pivotal connection with pitmen 24, extending forwardly for pivotal connection with cranks 25, which are rigidly mounted upon the shaft or axle 7.

Arranged near the rear end of the beam 5 is a vertical cross hopper 26, having its central vertical axis in alinement with the central longitudinal axis of the beam 5. This hopper is provided at its bottom with an air or mixing chamber 27, having sleeves 28, which receive the adjacent ends of the sections of the tubular beam 5, and are clamped thereto by bolts 29 or the like, with suitable packing 30, between these parts, for effecting an air tight joint. The hopper 26 has a perforated bottom 31, which may be formed of wire gauze or the like which supports the powdered insecticide. The bottom of the mixing chamber 27 is closed by a plate 32, held in place by bolts or the like. Arranged within the air or mixing chamber 27 is a coupling 33, having a partition or division wall 34, and downwardly discharging openings 35, upon opposite sides of this wall. A pipe 36 is connected with the forward end of the cylinder 17 and leads into the tubular beam 5 and is equipped with a check valve 37 which opens toward the tubular beam. The opposite end of the cylinder 17 is connected with the tubular beam 5 by means of pipe 38, which is equipped with a check valve 39. It is thus seen that the reciprocation of the plunger 20 will create a draft or current of air which will pass rearwardly to the tubular beam 5 and downwardly through the forward opening 35, into the mixing chamber 27. This air may pass through the perforated bottom 31, suitably agitating the powdered insecticide, a portion of which will fall into the air chamber, whereby the air will become laden with the powdered insecticide which then is discharged through the rear opening 35.

Screw-threaded upon the rear end of the tubular beam 5 is a coupling 40, having connection with a flexible hose 41, equipped at their outer ends with separate nozzles 42. The hose 41 diverge rearwardly and extend beyond the outer sides of the handles 11 and may be supported at selected elevations by means of strap irons 43, which are vertically adjustably attached to the handles 13, as shown.

In view of the foregoing description it will be seen that I have provided a dusting machine, so constructed that all parts thereof are balanced. By virtue of the location of the pumping cylinder 17, with respect to the traction wheel 8, the usual intermediate gearing is dispensed with, and the force is applied to the plunger rod 21, from the opposite sides of the traction wheel 8, in a balanced manner. The invention is in no way restricted to the precise type of hopper and mixing chamber, as shown, as other suitable forms of hopper and means to mix the powdered insecticide with the air may be employed, although the present illustration has been found to be satisfactory.

A machine of this character is adapted to be driven down the field, between the rows of cotton, and the nozzles 42 are adapted to spray the powdered insecticide upon the sides of the adjacent rows of cotton or other plant.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In a machine for spraying cotton plants or the like, a longitudinal beam, a traction wheel supporting the forward end of the beam, a pump cylinder extending longitudinally of the beam in balanced relation thereto, a plunger reciprocating within the pump cylinder, a plunger rod connected with the plunger, cranks arranged upon opposite sides of the traction wheel and driven thereby, pitmen connecting the cranks with the plunger rod so that the force from the opposite sides of the traction wheel is applied to the plunger rod in a balanced manner, a hopper mounted upon the beam in a balanced manner, means for conducting the air pressure from the pump cylinder to the hopper, and a pair of outlet pipes connected with the hopper and extending laterally therefrom to carry the powdered insecticide to the rows of the plants.

2. In a machine for spraying cotton plants or the like, a longitudinal beam, a traction wheel supporting the forward end of the beam, handles attached to the rear portion of the beam, a pump cylinder arranged beneath and secured to the beam and extending longitudnally thereof in balanced relation thereto, a plunger within the cylinder, a pair of cranks arranged upon opposite sides of the traction wheel and driven thereby, pitmen connected with the cranks and with the plunger rod so that the force from the opposite sides of the traction wheel is applied in a balanced manner to the piston rod, a hopper mounted upon the rear end of the beam in a balanced manner, pipe means between the cylinder and hopper, and outlet pipe means connected with the hopper.

3. In a machine for spraying cotton plants or the like, a traction wheel, a beam having its forward portion arranged above and mounted upon the traction wheel in a balanced manner, handles carried by the rear end of the beam, a pump cylinder mounted upon the beam and extending longitudinally of the same in balanced relation thereto, a plunger within the cylinder, a plunger rod connected with the plunger, pitmen connected with the plunger, cranks arranged upon opposite sides of the traction wheel and driven thereby and connected with the pitmen, and spraying means mounted upon the beam and having means of communication with the cylinder.

4. In a machine for spraying cotton plants or the like, a generally horizontal beam, a traction wheel supporting the forward end of the beam, a cylinder suspended from the beam in a balanced manner, a rod connected with the plunger, a crank driven by the traction wheel, a pitman connecting the crank and rod, spraying means mounted upon the beam, and means of communication between the spraying means and the cylinder.

5. A machine for spraying cotton plants or the like, comprising a tubular beam, a traction wheel supporting the forward end of the beam, a cylinder suspended from the beam and having communication with the interior of the tubular beam, a plunger within the cylinder, drivng connecting means between the plunger and the traction wheel, a hopper mounted upon the tubular beam and having communication with the interior of the tubular beam, and operating means connected with the outlet of the hopper.

6. In a machine for spraying cotton plants or the like, comprising a tubular beam, a traction wheel supporting the beam, manually operated guide means connected with the tubular beam, a cylinder carried by the tubular beam and having outlet means in communication with the interior of the tubular beam, a plunger in the cylinder, driving means between the plunger and traction wheel, and a spray means having means of communication with the interior of the tubular beam.

7. In a machine for spraying cotton plants or the like, a tubular beam, a traction wheel supporting the portion thereof, manually operated guide means connected with the tubular beam, air compressing mechanism carried by the tubular beam and in communication with the interior thereof, driving means between the traction wheel and air compressing mechanism, and spray means supported by the tubular beam and in communication with the interior thereof.

8. A machine for spraying cotton plants or the like, a tubular beam provided near its rear end with spaced openings with a partition arranged between said openings, a hopper having a mixing chamber through which the tubular beam passes, said openings being in communication with the mixing chamber, spray means connected with the rear end of the tubular beam, a traction wheel supporting the forward end of the tubular beam, air compressing mechanism mounted upon the tubular beam and driven by the traction wheel, and means of communication between the air compressing mechanism and the interior of the tubular beam upon the forward side of said partition.

In testimony whereof I affix my signature.

THOMAS R. EVANS, Sr.